United States Patent [19]
Werner et al.

[11] Patent Number: 5,932,943
[45] Date of Patent: Aug. 3, 1999

[54] BICYCLE DYNAMO HAVING A ROTARY-CURRENT GENERATOR

[75] Inventors: Hermann Werner; Erich Loessl, both of Eisenach; Burkard Mueller, Korschenbroich, all of Germany

[73] Assignee: FER Fahrzeugeletrik GmbH, Eisenach, Germany

[21] Appl. No.: 08/761,799

[22] Filed: Dec. 6, 1996

[30] Foreign Application Priority Data

Dec. 7, 1995 [DE] Germany .......................... 195 45 680

[51] Int. Cl.[6] .......................................... H02K 7/00
[52] U.S. Cl. .................. 310/67 A; 310/68 R; 310/156; 310/254; 322/8; 322/25
[58] Field of Search .................... 310/67 A, 68 R, 310/69, 154, 156, 180, 254, 258, 261; 361/101, 94, 87; 323/287, 244; 322/8–25

[56] References Cited

U.S. PATENT DOCUMENTS

| | | | |
|---|---|---|---|
| 2,430,705 | 11/1947 | Brown | 310/67 A |
| 4,555,656 | 11/1985 | Ryan | 320/5 |
| 4,677,328 | 6/1987 | Kumakura | 310/67 R |
| 4,752,852 | 6/1988 | Ahl et al. | 361/58 |
| 4,945,445 | 7/1990 | Schmerda et al. | 361/101 |
| 4,986,556 | 1/1991 | Hartmann | 280/260 |
| 5,099,189 | 3/1992 | Iwaki et al. | 322/25 |
| 5,164,622 | 11/1992 | Kordik | 310/67 R |
| 5,172,675 | 12/1992 | Kurosu et al. | 123/599 |
| 5,213,703 | 5/1993 | Furuyama et al. | 252/62.54 |
| 5,283,707 | 2/1994 | Conners et al. | 361/58 |
| 5,382,853 | 1/1995 | Von Der Heide et al. | 310/67 R |
| 5,465,019 | 11/1995 | Kliman | 310/156 |
| 5,481,178 | 1/1996 | Wilcox et al. | 323/224 |
| 5,532,531 | 7/1996 | Sakamoto | 310/49 R |
| 5,583,420 | 12/1996 | Rice et al. | 322/25 |
| 5,604,669 | 2/1997 | Strong, III | 363/17 |
| 5,606,246 | 2/1997 | Adachi | 322/8 |
| 5,659,217 | 8/1997 | Petersen | 310/156 |
| 5,684,352 | 11/1997 | Mita et al. | 310/156 |

FOREIGN PATENT DOCUMENTS 0 449 538   10/1991   European Pat. Off. .
43 17 817    6/1994   Germany .

*Primary Examiner*—Nestor Ramirez
*Assistant Examiner*—Tran N Nguyen
*Attorney, Agent, or Firm*—Evenson, McKeown, Edwards & Lenahan, P.L.L.C.

[57] ABSTRACT

A bicycle dynamo with a rotary-current generator having a stator and a rotor which can be rotated relative to the stator. The stator or the rotor has radially extending pole fingers which are wound individually with one surrounding magnetic coil winding respectively. The ratio of the number of poles of the rotor to the number of poles of the stator is a non-integer value, and the ratio of the number of poles of the stator to the number of poles of the rotor is a non-integer value. This permits the implementation of a bicycle dynamo of a high efficiency even at a relatively low riding speed, which may be used, for example, to power bicycle lighting systems.

13 Claims, 3 Drawing Sheets

BICYCLE DYNAMO HAVING A ROTARY-CURRENT GENERATOR

BACKGROUND AND SUMMARY OF THE INVENTION

This invention relates to a dynamo, and more particularly to a bicycle dynamo having a rotary-current generator which contains a stator and a rotor which can be rotated relative to the stator.

It is known that bicycle dynamos are used for feeding electric consuming devices arranged on the bicycle, specifically a headlight and a rear light, with electric energy generated by the wheel movement. The dynamos are arranged on the front wheel, for example, as side or spoke dynamos.

For the use on bicycles, for example, synchronous generators are known which have a single wire-wound coil on the stator and three permanent-magnet pole pairs on the rotor. Such single-phase bicycle dynamos have relatively high magnetic pole adherences. Another difficulty of such simply constructed bicycle dynamos is the fact that, although, because of the only one used coil, they have a high internal impedance which permits a self-limiting of the supplied power, a failure of the rear light or of the headlight results in a noticeable voltage rise at the respective other, still intact light source which therefore becomes excessively stressed. In addition, at riding speeds below 15 km/h, these simple conventional bicycle dynamos do not yet furnish a power which is satisfactory for the operation of the bicycle lighting system, and in the case of high rotational speeds, the efficiency clearly decreases because of the formation of pronounced turbulent flows.

From German Patent Document DE 43 17 817 C1, a bicycle dynamo with a rotary-current generator is known in the case of which the stator consists of three identically constructed induction coils with pole finger cages made of soft iron, in which case the pole fingers of the individual pole finger cages are offset with respect to one another in the rotating direction by one third respectively of the distance of two adjacent pole fingers of the same pole finger cage. This has the purpose of achieving a reduction of the magnetic pole adherence, that is, of the pole sensing ability, in that, in each case, only one stator cage can be in a full magnetic force connection while the respective other two stator cages partially take up a neutral position as the result of subtracting magnetic tensile forces on the pole fingers.

There is a need for a vehicle dynamo with a rotary-current generator which has a low pole sensing ability; even at low riding speeds, provides a relatively high electric output power; and can be produced by means of expenditures which are acceptably low for the field of bicycle electric systems.

These and other needs have been met by the present invention by providing a bicycle dynamo comprising a rotary-current generator including a stator and a rotor which can be rotated relative to the stator, one of the stator and the rotor having a first number of radially extending pole fingers which are individually wound with one surrounding magnetic coil winding respectively, the other of the stator and the rotor having a second number of poles, a ratio of the first number to the second number being a non-integer value, and a ratio of the second number to the first number being a non-integer value.

In the case of this dynamo, the stator and/or the rotor has radially extending pole fingers which are individually wound by means of one surrounding magnet coil winding respectively. The ratio of the number of poles of the rotor to the number of poles of the stator is a noninteger value, and the ratio of the number of poles of the stator to the number of poles of the rotor is a non-integer value. This non-integer pole ratio keeps the pole sensing ability of the dynamo low. The radially extending pole fingers and their individual winding with one magnet coil respectively permit the implementation of a rotary-current arrangement which, even at low riding speeds, that is, at low rotational rotor speeds, is able to provide a comparatively high electric power. In this case, the individual winding of the pole fingers on a correspondingly designed special machine can be carried out very economically and permits a high filling ratio of the grooves between the pole fingers. The bicycle dynamo which is designed in this manner, even starting at low riding speeds in the range of from 5 km/h to 10 km/h, has a remarkably high efficiency so that the increased electric power does not require any noticeably higher expenditures of force.

According to a further aspect of the present invention, the bicycle dynamo is further optimized by arranging the stator surrounding the rotor in a ring-shaped manner, the stator having twelve pole fingers which extend radially to the inside and are wound by one surrounding magnetic coil winding respectively, the respective magnetic coils of each third pole finger being connected in series from a star point, and the rotor containing a permanent magnet made of a plastic-bound neodymium iron boron material with eight circumference-side magnetic poles. This embodiment has particularly low losses in the no-load as well as in the load operation which, in addition to being the result of the special individual pole finger winding, mainly results from the specifically selected pole number ratio, the selection of a laminated stator preferably made of high-quality dynamo sheet metal as well as the use of a plastic-bound neodymium iron boron material for the rotor.

According to a further aspect of the present invention, a voltage-limiting switching circuit part is provided in the load current circuit which lets the rectified output voltage pass through unaffected below a selected limit voltage whereas, in the case of an input voltage which is above the limit voltage, it controls the voltage at the output of the switching circuit part to the limit voltage. In this manner, the electric supply voltage, for example, for the bicycle lighting, remains at a constant value at a rising riding speed, and, when the rear light or the headlight fails, there is no danger of an excessive loading of the other, still intact light source.

According to a further aspect of the present invention, the voltage-limiting switching circuit part contains a current limiting circuit which controls a switch of the switching circuit part in a current-breaking manner as soon as a given limit voltage is exceeded by way of an intermediate resistance, which limit voltage is selected such that a torque produced by the generator is limited to a value which prevents a slipping of a torque transmitting part provided on an input side of the generator. This embodiment has the advantage that, as the result of the current-limiting switching, not only the dynamo is protected from an overload and a short-circuit, but mainly also the generator torque is limited in order to prevent a slipping of a mechanical torque transmitting part, for example, a toothed belt or a roller, provided on the generator input side.

According to a further aspect of the present invention, a field effect transistor with an excess temperature switch is used as the power switch of the switching circuit part, whereby, at a high bicycle speed, in the case of a short circuit, an overheating of this switch is avoided.

Other objects, advantages and novel features of the present invention will become apparent from the following

DETAILED DESCRIPTION OF THE DRAWINGS

Figure 1:
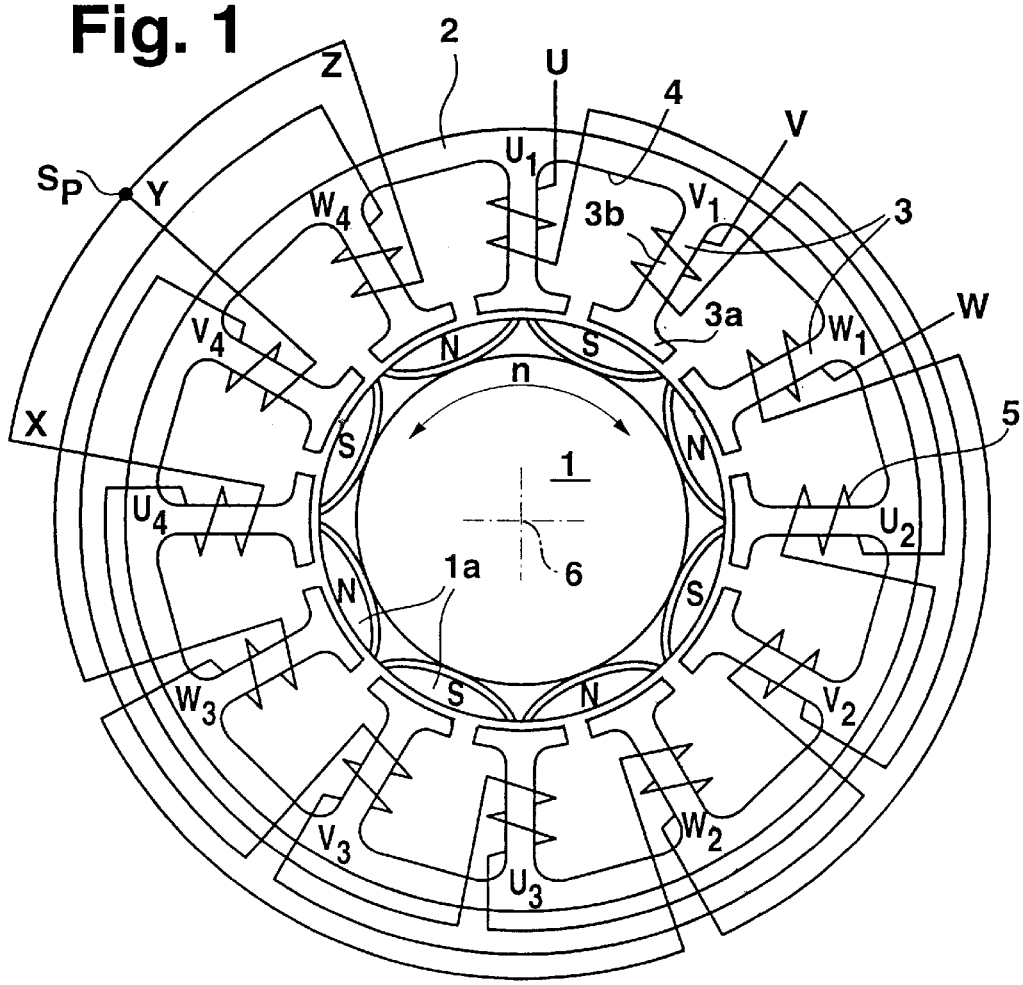
FIG. 1 is a schematic lateral view of the stator-rotor complex of a rotary-current bicycle dynamo according to a preferred embodiment of the present invention with individually wound pole fingers.

FIG. 1 shows an advantageous construction of the stator-rotor complex of a rotary-current generator for a bicycle dynamo. The interior rotor 1 contains a permanent magnet ring made of a plastic-wound neodymium iron boron material which, in the circumferential direction, has eight magnetic poles 1a and which, as usual, alternately has a magnetic south pole (S) and a magnetic north pole (N). The stator 2 surrounds the interior rotor 1 in a ring shape coaxially to the axis of rotation 6 of the rotor and contains twelve pole fingers 3 which extend radially to the inside, are arranged in an equidistant manner in the circumferential direction and, on their free ends 3a situated opposite the magnetic poles 1a of the rotor, widen with respect to a narrower center area 3b while forming grooves 4 between the pole fingers 3. On the whole, the stator 2 is constructed as a laminated stator made of a high-quality dynamo metal sheet which reduces the occurrence of turbulent flows. The illustrated stator-rotor construction therefore has a ratio of the rotor pole number to the stator pole number of 2/3. This non-integer pole ratio results in a very low pole sensing ability in the case of which the ripple of the output voltage of the rotary-current system immediately after the rectification amounts to approximately 4%.

Each pole finger 3 of the stator 2 is wound individually in its center area 3b with a separate magnetic coil 5, in which case the winding can take place very economically in an automatic fashion on a special machine. In this case, the winding can be carried out with a comparatively high filling ratio of the grooves 4 between the individual pole fingers 3, in which case, because of its position which radially is noticeably spaced away from the axis of rotation 6, the coil receiving grooves 4 provide a relatively large receiving space for the magnetic coil windings 5.

In an alternative embodiment, the magnetic poles 1a may extend radially as pole fingers rather than, or in addition to, the pole fingers 3 of the stator 2, and may be individually wound with respective surrounding magnetic coil windings.

Figure 2:
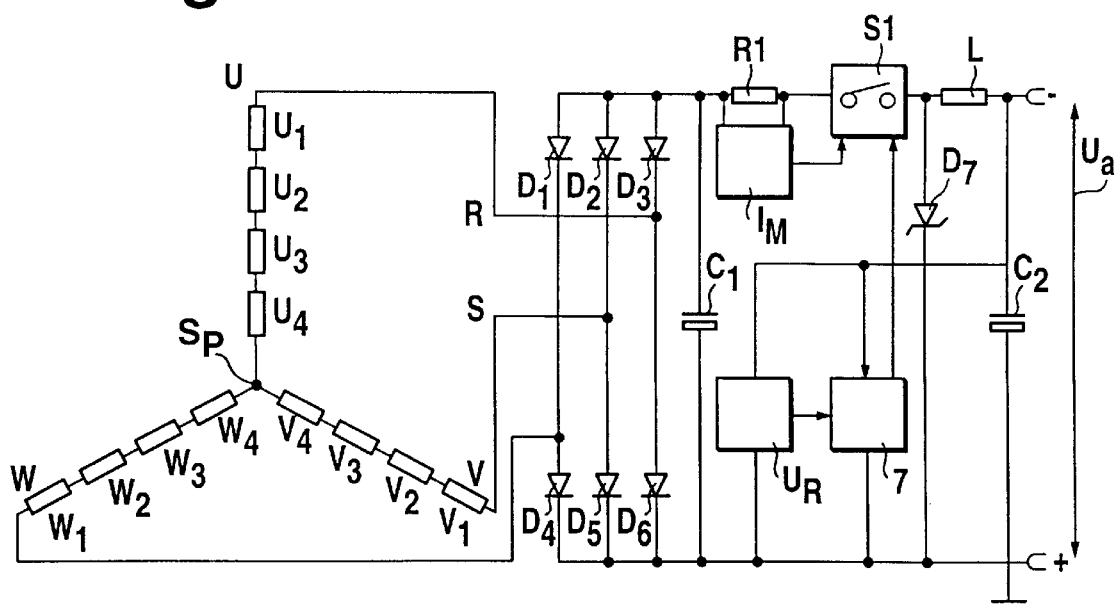
FIG. 2 is a schematic block diagram of a bicycle dynamo having the stator-rotor complex of FIG. 1.

The magnetic coils 5 of the individual pole fingers 3 are connected with one another in a rotary-current star connection, the three rotary-current line branches (x, y, z) branching off from the star point ($S_p$), in which branches four magnetic coils ($U_1$ to $U_4$; $V_1$ to $V_4$; $W_1$ to $W_4$) are connected behind one another. In each case, the magnetic coils of each third pole finger 3 belong to the same rotary-current line branch (x, y, z). In its left half, FIG. 2 shows the equivalent circuit diagram which is the result of this wiring of the individual magnetic coils 5 of FIG. 1 and has the three outputs (U, V, W) of the star connection with the star point ($S_p$). The star connection has the advantage that the winding can take place by means of a thicker wire which results in a better filling ratio of the grooves 4.

Also, FIG. 2 shows the further circuit-technological construction for the bicycle dynamo with the stator-rotor complex of FIG. 1. As illustrated in FIG. 2, first a rectification takes place of the three rotary-current phases which are conducted by way of the external conductors (R, S, T) of the rotary-current star connection by means of a conventional bridge circuit with six semiconductor diodes ($D_1$ to $D_6$). A capacitor ($C_1$) which follows buffers the rectified voltage and smooths it to a residual ripple of less than 4%. A switching circuit part which is then arranged in the load circuit has the effect that the output voltage ($U_a$) of the dynamo, independently of the load, is limited to a predetermined limit voltage of approximately 13.5 V for the system designed for 12V/6.2 W. By means of this wiring, the current in the windings can be maintained to be essentially constant and the copper losses can be kept low. The currents remain approximately sinusoidal which is also advantageous with respect to the iron losses.

Specifically, for this purpose, the wiring circuit part has a controllable transistor power switch (S1), a storage choke (coil) (L) which is connected in series thereto, and a capacitor ($C_2$) which is situated in parallel to the output. A reference voltage unit ($U_R$) generates a voltage reference representative of the selected limit voltage which voltage reference is supplied to a control unit 7 which compares the actual voltage on the capacitor ($C_2$) of the switching circuit part with the limit voltage and controls the transistor power switch (S1) which is otherwise switched to be conductive to be blocking as soon as this actual voltage rises above the limit voltage. More precisely, the switching circuit part operates as a two-position controller with a certain hysteresis for avoiding undesirable switching oscillations; that is, the transistor power switch (S1) is switched to be blocking when, for example, a limit voltage value of 13.6 V is exceeded and is switched conductive again when there is a falling below a limit voltage value of approximately 13.4 V. In the case of this two-position control, a lower pulse-width repetition rate and a higher switching frequency of the switching circuit part occurs as the input voltage rises.

In parallel to the capacitor ($C_2$) but in front of the storage choke (coil) (L), a Schottky diode ($D_7$) of the switching circuit part is also situated. In front of the transistor power switch (S1), a current limiting circuit ($I_M$) is situated which controls the transistor power switch (S1) to be blocking as soon as a given maximal voltage drop occurs by way of an additional resistance (R1). As a result, the dynamo is protected from overloading and short-circuiting. Simultaneously, the generator torque is limited which, in the case of a spoke dynamo, prevents a slipping of the toothed belt used there for transmitting the torque or which, in the case of a construction as a side dynamo, prevents a slipping on the tire of the roller used there. In order to prevent an overheating of the transistor power switch (S1) also at a high speed in the case of a short circuit, a field effect transistor with an excess temperature switch-off is preferably used as a power switch (S1).

The switching circuit part has a high voltage stability and has the characteristic of providing the voltage supplied by the generator star connection virtually without any losses as the output voltage ($U_a$) as long as the mit voltage has not been reached. The partially blanking intervention of the switching circuit part does not start before the limit voltage is exceeded by the input voltage. With the exception of the storage choke (L) and the two capacitors ($C_1$, $C_2$) in the Elko-construction, the switching circuit part can be constructed according to SMD technology. The units, which are drawn only as function blocks, such as the current limiting circuit ($I_M$), the voltage reference circuit ($U_R$) and the control unit 7, are of a conventional construction which a person skilled in the art can easily implement in the knowledge of the above-described required functions, which therefore are not discussed here in further detail. In addition, on the printed circuit board of the switching circuit part, the twelve magnetic coils 3 can at the same time be connected with one another, in which case this connection can take place as an alternative, at least for the most part, also already on the automatic winding machine.

Figure 3:
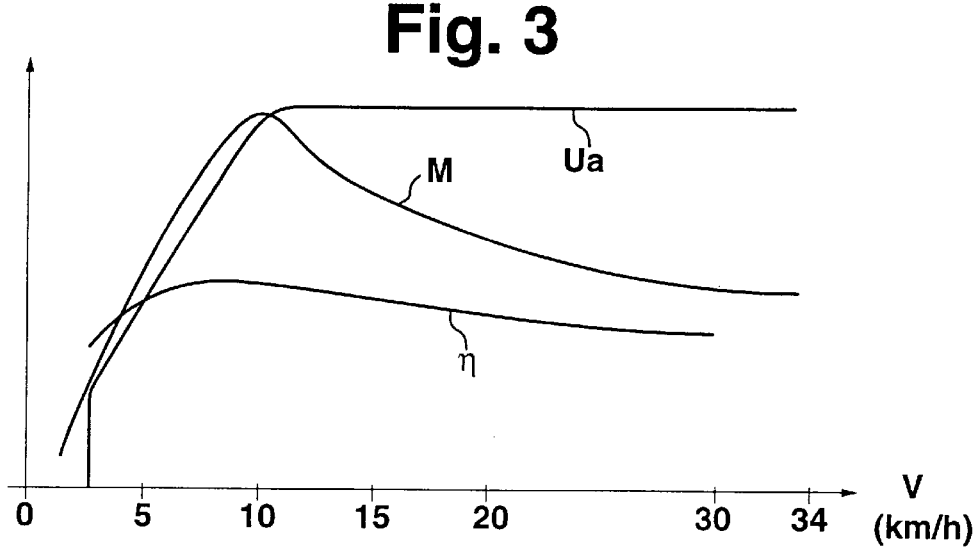
FIG. 3 is a diagram for illustrating typical characteristic curves for the output voltage, the torque and the efficiency as a function of the riding speed for the bicycle dynamo of FIG. 1 and 2.

FIG. 3 shows typical characteristic curves for a bicycle dynamo implemented according to FIG. 1 and 2 as a function of the riding speed (V). The generated output voltage ($U_a$) measured on a standardized load of 29.4 Ω starts at 2.5 km/h with approximately 2.8 V; at 5 km/h and 7.5 km/h already amounts to 6.6 V and 10.1 V; and converges as of approximately 12.5 km/h toward the selected limit voltage of 13.5 V which is maintained for higher riding speeds by the voltage limiting function of the switching circuit part. At a low riding speed, the torque (M) rises first until it has reached its maximum at approximately 10 km/h and drops again with an increasing riding speed. Even at 2.5 km/h, the efficiency η is 0.45 and rises at 5 km/h to 0.62. In the range between 7.5 km/h and 10 km/h, the efficiency η travels through its maximum with a remarkable value of approximately 0.67 and then falls only relatively slightly. Even at a riding speed of approximately 30 km/h, the efficiency η is still approximately 0.5.

It is therefore demonstrated that the illustrated construction of the bicycle dynamo, by means of the use of the turbulence-reducing laminated stator 2, the high-quality magnet material for the rotor 1 and the characteristic design of pole fingers which are individually provided with magnetic coils and their connection in a rotary-current star connection with a voltage-limiting switching circuit part in the load circuit results in a very powerful 12 V/6.2 W system which already at 10 km/h reaches essentially its desired maximum voltage; also at higher riding speeds still has a remarkable efficiency; and is limited in its supply voltage in a load-independent manner.

Figure 4:
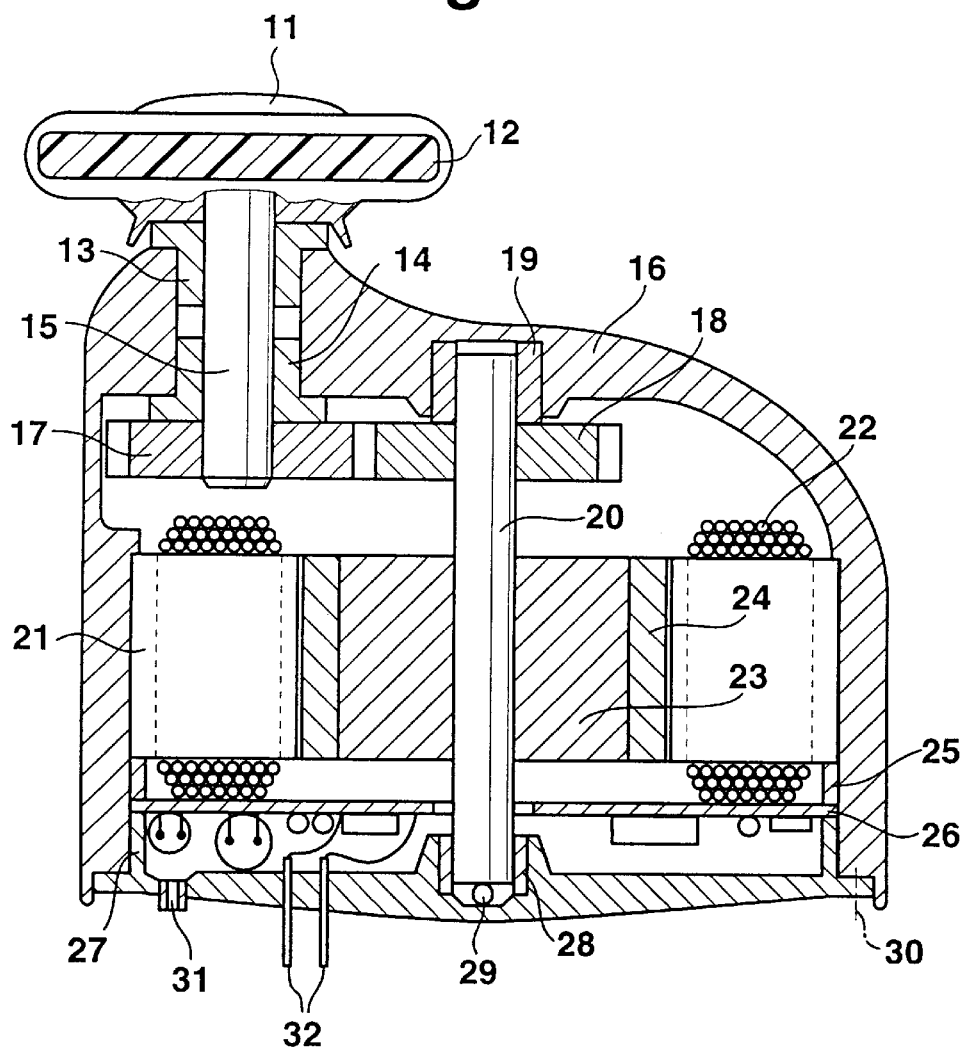
FIG. 4 is a longitudinal sectional view of a bicycle dynamo according to FIG. 1 and 2 in a side dynamo construction.

FIG. 4 illustrates an implementation of the bicycle dynamo of FIGS. 1 and 2 as a side runner dynamo. The dynamo contains a roller support 11 on which a roller 12 is carried and which transmits the torque by way of a drive shaft 15 held in bearings 13, 14 into the interior of a dynamo housing 16 to a gear wheel 17 with which an adjacent gear wheel 18 is engaged which is non-rotatably disposed on a generator shaft 20 which on both sides is held in bearings 19, 28 and is supported on the lower front end on a ball 29. The lateral displacement of the drive shaft 15 and the generator shaft 20 is advantageous because of the large generator diameter.

In its construction, the generator part corresponds to that of FIG. 1. An interior rotor 23 is non-rotatably disposed on the generator shaft 20 and is provided with the 8-pole permanent magnet 24 in an exterior circumference area. Coaxially, the rotor 23 is surrounded by the ring-shaped laminated stator 21 which has the twelve pole fingers which project radially to the interior and are magnetic-coil-wound individually, and of which the pertaining end winding 22 is outlined. By way of a spacing ring 25, the pertaining printed circuit board 26, which contains the switching circuit part, is mounted on the underside of this generator arrangement and is held by a cover 27 closing off on the underside which is mounted on the housing 16 by way of screwed connections 30. The cover has a ventilating and deventilating opening 31 as well as guided-through push-in connections 32 by means of which the generated output voltage can be tapped on the outside.

Figure 5:
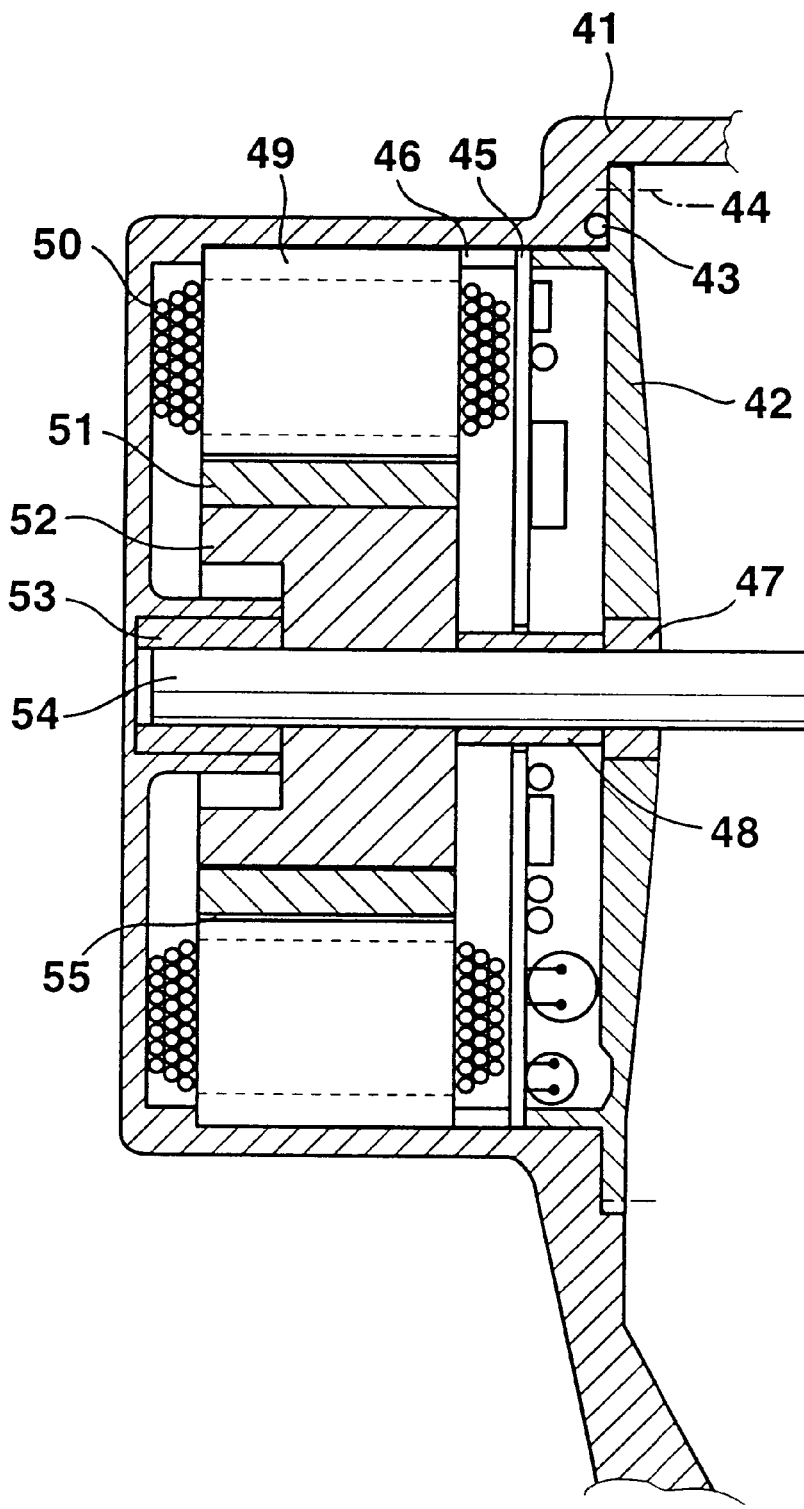
FIG. 5 is longitudinal sectional view of a bicycle dynamo according to FIG. 1 and 2 in a spoke dynamo construction.

FIG. 5 shows the implementation of the vehicle dynamo illustrated in FIGS. 1 and 2 in a spoke dynamo construction. In this case, the generator shaft 54 is held in the center by way of a rearward bearing 53 on the dynamo housing 41 and by way of a forward sealing bearing 47 on a housing cover 42, and is driven in a conventional manner by way of a gear wheel or a toothed belt. By way of screwed connections 44, the cover 42 is fixed to the housing 41. The pot-shaped housing 41 accommodates the stator-rotor complex which is linked with the generator shaft 54 and which consists of the interior rotor with the interior magnet carrier 52 and the exterior 8-pole permanent magnet 51 as well as the exterior laminated stator 49 with the end winding 50 and the twelve individually wound pulse fingers, an air gap 55 remaining free between the rotor 51, 52 and the coaxial stator 49. A sealing ring 43 seals off the housing interior when the cover 42 is deposited. Between the cover 42 and the rotor magnet carrier 52, a spacing sleeve 48 is pushed into the generator shaft 54. Within the thus created, axial installation space, the printed circuit board 45 is entered with the switching circuit part and the required strip conductors at a distance to the stator defined by a spacing ring 46, in which case it is held on the side facing away from the spacing ring 46 by an axial ring flange of the cover 42.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A bicycle dynamo comprising a rotary-current generator including a stator and a rotor which can be rotated relative to the stator, one of the stator and the rotor having a first number of radially extending pole fingers which are individually wound with one surrounding magnetic coil winding respectively, the other of the stator and the rotor havina a second number of poles, a ratio of said first number to said second number being a non-integer value, and a ratio of said second number to said first number being a non-integer value, wherein the stator surrounds the rotor in a ring-shaped manner and has twelve pole fingers which extend radially to the inside and are wound by one surrounding magnetic coil winding respectively, the respective magnetic coils of each third pole finger being connected in series from a star point, and the rotor containing a permanent magnet made of a plastic-bound neodymium iron boron material with eight circumference-side magnetic poles.

2. A bicycle dynamo according to claim 1, further comprising a voltage-limiting switching circuit part which is arranged in a load circuit, said voltage-limiting switching part allowing an input voltage to pass unaffected up to a predetermined limit voltage and limiting said input voltage above said predetermined limit voltage to said predetermined limit voltage.

3. A bicycle dynamo according to claim 2, wherein said voltage-limiting switching circuit part contains a current limiting circuit which controls a switch of the switching circuit part in a current-breaking manner as soon as a given limit voltage is exceeded by way of an intermediate resistance, which limit voltage is selected such that a torque produced by the generator is limited to a value which prevents a slipping of a torque transmitting part provided on an input side of the generator.

4. A bicycle dynamo according to claim 3, wherein the switching circuit part includes a field effect transistor power switch with an excess-temperature switch-off.

5. A bicycle dynamo according to claim 2, wherein the switching circuit part includes a field effect transistor power switch with an excess-temperature switch-off.

6. A bicycle dynamo according to claim 5, wherein said rotor is driven by a shaft which is operatively coupled with a bicycle wheel.

7. A bicycle dynamo according to claim 2, wherein said rotor is driven by a shaft which is operatively coupled with a bicycle wheel.

8. A bicycle dynamo according to claim 3, wherein said rotor is driven by a shaft which is operatively coupled with a bicycle wheel.

9. A bicycle dynamo according to claim 1, wherein said rotor is driven by a shaft which is operatively coupled with a bicycle wheel.

10. A bicycle dynamo according to claim 2, wherein an efficiency of the dynamo is at least 0.45 throughout a range of riding speeds from 2.5 km/h to 30 km/h.

11. A bicycle dynamo comprising a rotary-current generator including a stator and a rotor which is driven by a shaft which can be operatively coupled with a bicycle wheel so that said rotor can be rotated relative to the stator, the stator having a first number of radially extending pole fingers which are individually wound with one surrounding magnetic coil winding respectively, the rotor containing a permanent magnet arrangement having a second number of poles, a ratio of said first number to said second number being a non-integer value, and a ratio of said second number to said first number being a non-integer value, and further comprising a rectifier arrangement for rectifying rotary current from said rotary current Generator and feeding rectified current and voltage to a load via voltage-limiting switching circuitry which directly controls said voltage and said current applied to said load by allowing said voltage from said rectifier arrangement to pass unaffected up to a predetermined limit voltage and limiting said voltage from said rectifier arrangement above said predetermined limit voltage to said predetermined limit voltage, wherein the stator surrounds the rotor in a ring-shaped manner and has twelve pole fingers which extend radially to the inside and are wound by one surrounding magnetic coil winding respectively, the respective magnetic coils of each third pole finger being connected in series from a star point, and the rotor containing a permanent magnet mate of a plastic-bound neodymium iron boron material with eight circumference-side magnetic poles.

12. A bicycle dynamo according to claim 10, wherein said voltage limiting switching circuitry contains a current limiting circuit which controls a switch of the switching circuitry in a current-breaking manner as soon as the given limit voltage is exceeded by way of an intermediate resistance, which limit voltage is selected such that a torque produced by the generator is limited to a value which prevents a slipping of a torque transmitting part provided on an input side of the generator.

13. A bicycle dynamo according to claim 11, wherein the switching circuitry includes a field effect transistor power switch with an excess temperature switch-off.

* * * * *